United States Patent
Na et al.

(10) Patent No.: US 10,057,188 B2
(45) Date of Patent: Aug. 21, 2018

(54) METHOD AND APPARATUS FOR PROVIDING MULTICAST SERVICE AND METHOD AND APPARATUS FOR ALLOCATING MULTICAST SERVICE RESOURCE IN TERMINAL-TO-TERMINAL DIRECT COMMUNICATION

(71) Applicant: ELECTRONICS AND TELECOMMUNICATIONS RESEARCH INSTITUTE, Daejeon (KR)

(72) Inventors: Jeehyeon Na, Daejeon (KR); Dae Ik Kim, Daejeon (KR); Hyung-Sub Kim, Daejeon (KR); Yeon Seung Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 233 days.

(21) Appl. No.: 14/863,969

(22) Filed: Sep. 24, 2015

(65) Prior Publication Data

US 2016/0112345 A1    Apr. 21, 2016

(30) Foreign Application Priority Data

Oct. 20, 2014  (KR) .................. 10-2014-0142037

(51) Int. Cl.
*H04L 12/927*  (2013.01)
*H04W 76/02*  (2009.01)
(Continued)

(52) U.S. Cl.
CPC .......... *H04L 47/806* (2013.01); *H04W 4/025* (2013.01); *H04W 72/005* (2013.01);
(Continued)

(58) Field of Classification Search
CPC .. H04L 47/806; H04W 4/025; H04W 72/005; H04W 76/021; H04W 76/023
See application file for complete search history.

(56) References Cited

U.S. PATENT DOCUMENTS

| 2005/0002405 A1* | 1/2005 | Gao ..................... G06F 13/102 370/401 |
| 2005/0213576 A1* | 9/2005 | Stephens ................ H04L 12/12 370/390 |

(Continued)

FOREIGN PATENT DOCUMENTS

| KR | 10-2011-0089311 A | 8/2011 |
| KR | 10-2013-0063694 A | 6/2013 |

*Primary Examiner* — Derrick Ferris
*Assistant Examiner* — Kevin Lee
(74) *Attorney, Agent, or Firm* — NSIP Law

(57) ABSTRACT

A method of providing a multicast service is provided by a terminal in a terminal-to-terminal direct communication. The terminal transmits a service start request message requesting a start of a multicast service to a multicast server, and receives a service start response message including a result of permitting a start request from the multicast server. The terminal receives, via a base station, resource information of a resource which a multicast coordinator allocates to the multicast service in accordance with a request of the multicast server, and transmits multicast service data based on the resource information.

16 Claims, 8 Drawing Sheets

(51) Int. Cl.
*H04W 4/02* (2018.01)
*H04W 76/14* (2018.01)
*H04W 76/11* (2018.01)
*H04W 72/00* (2009.01)

(52) U.S. Cl.
CPC ....... *H04W 76/021* (2013.01); *H04W 76/023* (2013.01); *H04W 76/11* (2018.02); *H04W 76/14* (2018.02)

(56) References Cited

U.S. PATENT DOCUMENTS

| | | | |
|---|---|---|---|
| 2010/0265867 A1* | 10/2010 | Becker | H04W 72/005 370/312 |
| 2012/0023533 A1* | 1/2012 | Wang | H04N 21/4622 725/109 |
| 2012/0093098 A1 | 4/2012 | Charbit et al. | |
| 2013/0148526 A1* | 6/2013 | Hwang | H04W 4/08 370/252 |
| 2013/0295976 A1* | 11/2013 | Patil | H04W 24/10 455/501 |
| 2014/0092801 A1* | 4/2014 | Kim | H04L 12/1877 370/312 |
| 2014/0162643 A1* | 6/2014 | Lee | H04W 4/008 455/435.1 |
| 2014/0181257 A1* | 6/2014 | Sridhar | H04W 4/029 709/219 |
| 2016/0323922 A1* | 11/2016 | Park | H04W 24/10 |
| 2017/0094495 A1* | 3/2017 | Ke | H04W 4/023 |

\* cited by examiner

METHOD AND APPARATUS FOR PROVIDING MULTICAST SERVICE AND METHOD AND APPARATUS FOR ALLOCATING MULTICAST SERVICE RESOURCE IN TERMINAL-TO-TERMINAL DIRECT COMMUNICATION

CROSS-REFERENCE TO RELATED APPLICATION

This application claims priority to and the benefit of Korean Patent Application No. 10-2014-0142037 filed in the Korean Intellectual Property Office on Oct. 20, 2014, the entire contents of which are incorporated herein by reference.

BACKGROUND (a) Field

The present invention generally relates to a method and an apparatus for providing a multicast service and a method and an apparatus for allocating a multicast service resource in a terminal-to-terminal direct communication.

(b) Description of the Related Art

Recently, technologies for providing a direct communication between terminals on the same cell or neighboring cells are being developed in a wireless communication system. The terminal-to-terminal direct communication is called a device-to-device (D2D) communication. In the conventional wireless communication system, a communication between terminals is performed through an infrastructure such as a base station. The terminal-to-terminal direct communication is a communication scheme for directly transmitting or receiving data between the terminals without passing the infrastructure.

The terminal-to-terminal direct communication may be performed through an unlicensed band as in WiFi-Direct™ or Bluetooth™. Alternatively, terminal-to-terminal direct communication may be performed through a licensed band such as a cellular communication band. If the terminal-to-terminal direct communication is performed through the unlicensed band, it is difficult to provide the scheduled and controlled service and the performance can be rapidly deteriorated. Therefore, the terminal-to-terminal direct communication through the cellular communication band is being developed.

Particularly, the terminal-to-terminal direct communication can be used for a multicast service. In the multicast service, a plurality of users can simultaneously receive the service through one channel such that the resource can be efficiently used. The multicast service can be used for a broadcast service.

A base station should allocate resources for the multicast service in order to support the multicast service of the terminal-to-terminal direct communication in the conventional cellular communication. Therefore, the multicast service can be provided within only the coverage of one base station. As a result, a terminal that is near a base station for providing the multicast service but belongs to the other base station cannot receive the multicast service.

SUMMARY

An embodiment of the present invention provides a method and an apparatus for providing a multicast service and a method and an apparatus for allocating a multicast service resource in a terminal-to-terminal direct communication, capable of allocating a resource for the multicast service regardless of a base station.

According to another embodiment of the present invention, a method of providing a multicast service is provided by a terminal in a terminal-to-terminal direct communication. The method includes transmitting a service start request message requesting a start of a multicast service to a multicast server and receiving a service start response message including a result of permitting a start request from the multicast server. The method further includes receiving, via a base station, resource information of a resource which a multicast coordinator allocates to the multicast service in accordance with a request of the multicast server, and transmitting multicast service data based on the resource information.

The service start request message may include an identifier of the multicast service and location information of the terminal.

The service start request message may further include quality of service (QoS) information for the multicast service.

The method may further include reporting a status of the allocated resource to the multicast coordinator via the base station and receiving changed resource information for the multicast service from the multicast coordinator via the base station.

The method may further include transmitting a multicast subscribe request message to the multicast server before transmitting the service start request message and receiving a multicast subscribe response message including a result of the multicast subscribe request from the multicast server.

The multicast subscribe request message may include a service type of the multicast service. The service type may indicate whether the multicast service is provided in a multicast scheme or a broadcast scheme.

The multicast subscribe request message may include an identifier of the terminal and mobility degree of the terminal.

According to yet another embodiment of the present invention, a method of allocating a resource for a multicast service is provided by a multicast coordinator in a terminal-to-terminal direct communication. The method includes receiving from a multicast server a multicast session start request message requesting resource allocation for a multicast service in accordance with a request of a terminal starting the multicast service, and allocating a resource to the multicast service. The method further includes storing resource information of the allocated resource and information on the multicast service and transmitting a resource allocation request message including the resource information to a plurality of base stations.

The resource information may be transmitted to the terminal through at least one of the plurality of base stations.

The multicast session start request message may include an identifier of the multicast service and an identifier of the terminal.

The multicast session start request message may further include QoS information for the multicast service and location information of the terminal.

The resource allocation request message may further include an identifier of the multicast service.

The resource allocation request message may further include QoS information for the multicast service and service area information of the multicast service.

According to still another embodiment of the present invention, an apparatus for providing a multicast service is provided in a terminal-to-terminal direct communication. The apparatus includes a processor and a transceiver. The processor generates a service start request message requesting a start of a multicast service. The transceiver transmits the service start request message to a multicast server and receives a service start response message including a result of permitting a start request from the multicast server. Further, the transceiver receives, via a base station, resource information of a resource which a multicast coordinator allocates to the multicast service in accordance with a request of the multicast server, and transmits multicast service data based on the resource information.

The service start request message may include an identifier of the multicast service and location information of the terminal.

The processor may generate a multicast subscribe request message including information on a service type of the multicast service. The transceiver may transmit the multicast subscribe request message to the multicast server and may receive a multicast subscribe response message including a result of the multicast subscribe request from the multicast server. The service type may indicate whether the multicast service is provided in a multicast scheme or a broadcast scheme.

According to further embodiment of the present invention, an apparatus for allocating a resource for a multicast service is provided in a terminal-to-terminal direct communication. The apparatus includes a database, a processor, and a transceiver. The processor allocates a resource to a multicast service in response to a multicast session start request message that is transmitted by a multicast server in accordance with a request of a terminal starting the multicast service. Further, the processor stores resource information of the allocated resource and information on the multicast service in the database. The transceiver receives the multicast session start request message and transmits a resource allocation request message including the resource information to a plurality of base stations.

The resource information may be transmitted to the terminal through at least one of the plurality of base stations.

The multicast session start request message may include QoS information for the multicast service and location information of the terminal.

The resource allocation request message may further include QoS information for the multicast service and service area information of the multicast service.

DETAILED DESCRIPTION OF THE EMBODIMENTS

Figure 1:
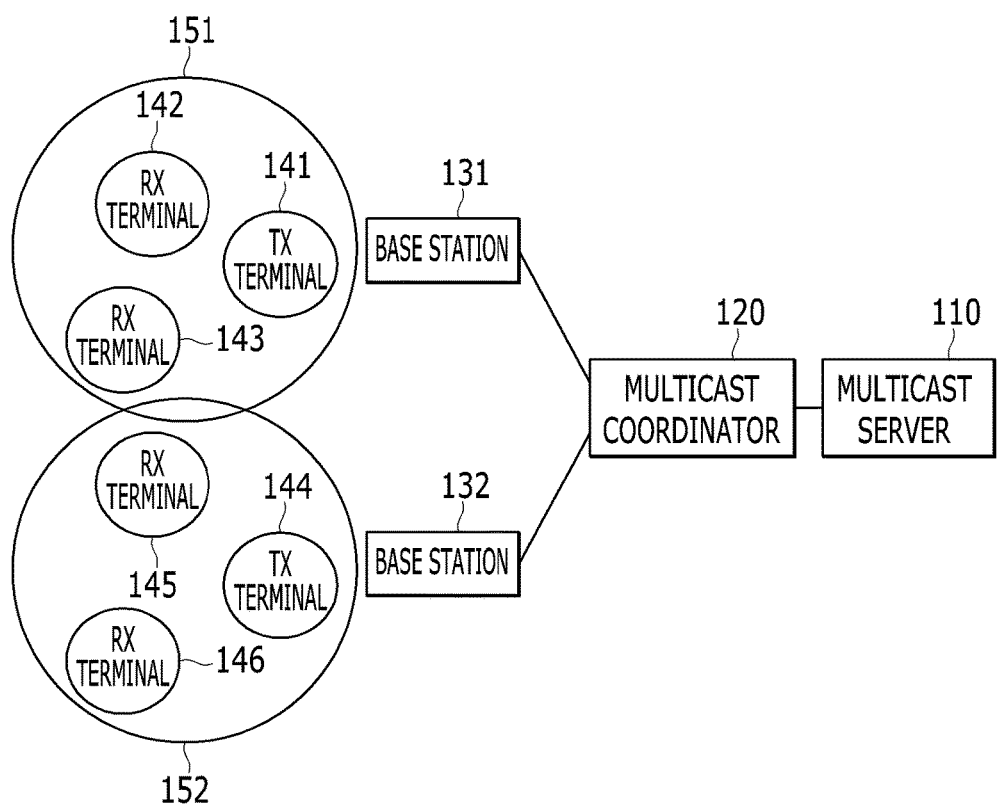
FIG. 1 schematically shows a multicast service system in a terminal-to-terminal direct communication according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, the term "terminal" may designate a user equipment (UE), a mobile terminal (MT), a mobile station (MS), an advanced mobile station (AMS), a high reliability mobile station (HR-MS), a subscriber station (SS), a portable subscriber station (PSS), an access terminal (AT), and so on, or may include all or some functions thereof.

Further, the term "base station" (BS) may designate a node B, an evolved node B (eNB), an advanced base station (ABS), a high reliability base station (HR-BS), an access point (AP), a radio access station (RAS), a base transceiver station (BTS), and so on, or may include all or some functions thereof.

Now a method and an apparatus for providing a multicast service and a method and an apparatus for allocating a multicast service resource in a terminal-to-terminal direct communication is described with reference to the drawings.

FIG. 1 schematically shows a multicast service system in a terminal-to-terminal direct communication according to an embodiment of the present invention.

Referring to FIG. 1, a multicast service system includes a multicast server 110, a multicast coordinator 120, base stations 131 and 132, and a plurality of terminals 141, 142, 143, 144, 145, and 146.

The multicast server 110 manages information for providing a terminal-to-terminal [hereinafter referred to as "device-to-device (D2D)"] multicast service such as a D2D broadcast. For example, the multicast server 110 may manage user information for the D2D multicast service, D2D multicast service information, a quality of service (QoS) for the D2D multicast service, authentication information, location information of a D2D multicast service provider, and/or area information of the D2D multicast service. The multicast server 110 is connected to the multicast coordinator 120.

The multicast coordinator 120 is connected to the base stations 131 and 132, manages the base stations 131 and 132, and performs resource allocation for the D2D multicast service. The multicast coordinator 120 manages resource allocation information based on the QoS for the D2D multicast service and the D2D multicast service area. The resource allocation information includes, for example, an allocation position, an allocation size, and/or an allocation period. The multicast coordinator 120 may allocate resources for the D2D multicast service resources in advance, or may dynamically allocate the resources in accordance with usage of resources for the D2D multicast service. The multicast coordinator 120 provides the neighboring base stations 131 and 132 with resource allocation information of the resources allocated to the D2D multicast service. Accordingly, the neighboring base stations 131 and 132 cannot use resources indicated by the resource allocation information as resources for the cellular communication.

The base stations 131 and 132 receives the resource allocation information from the multicast coordinator 120, and transfer the resource allocation information to terminals 141-143 and 144-146 that exist within their coverage and join in the D2D multicast service. Further, the base stations 131 and 132 do not use the resources indicated by the resource allocation information as resources for the cellular communication.

The terminals 141-146 includes multicast transmitting terminals 141 and 144 for transmitting the D2D multicast services and multicast receiving terminals 142, 143, 145, and 146 for receiving the D2D multicast services transmitted by the multicast transmitting terminals 141 and 144. Each of the multicast transmitting terminals 141 and 144 can adjust a D2D multicast range 151 or 152 that corresponds to a range to which the transmitted D2D multicast service reaches. Further, each of the multicast transmitting terminals 141 and 144 can transmit the D2D multicast service to a terminal of a different cell as well as a terminal of the same cell.

Figure 2:
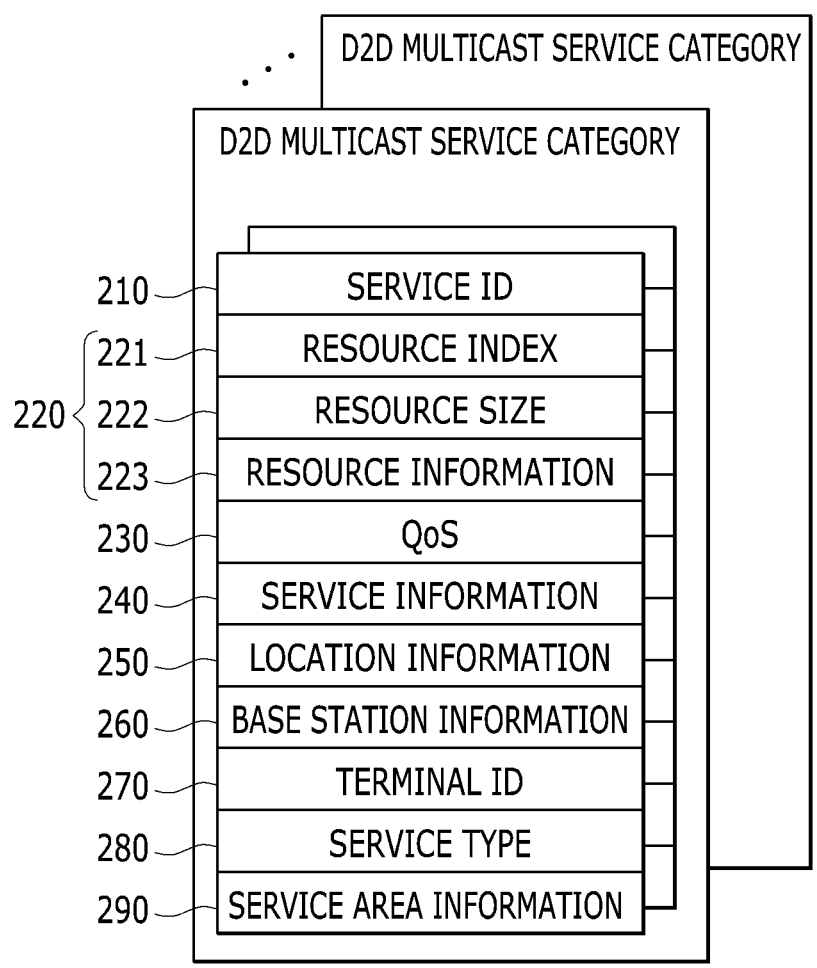
FIG. 2 schematically shows resource management by a multicast coordinator in a terminal-to-terminal direct communication according to an embodiment of the present invention.

FIG. 2 schematically shows resource management by a multicast coordinator in a D2D direct communication according to an embodiment of the present invention.

Referring to FIG. 2, a multicast coordinator (120 of FIG. 1) manages, for each D2D multicast service, information of the corresponding D2D multicast service. The multicast coordinator may be a logical entity.

Each D2D multicast service information includes a service identifier (ID) 210, D2D multicast service resource information 220, QoS information 230, service information 240, location information 250, base station information 260, a terminal ID 270, a service type 280, and service area information 290.

The service ID 210 is an identifier for identifying the D2D multicast service. The D2D multicast service resource information 220 is information on a resource allocated to the D2D multicast service, and may include a resource index 221 indicating an index of the allocated resource, a resource size 222 indicating a size of the allocated resource, and resource information 223 indicating information of the allocated resource. The resource information 223 may include a position of the allocated resource and use characteristic of the allocated resource. The use characteristic may include modulation and coding scheme (MCS) information that varies according to the D2D multicast service range.

The QoS information 230 represents a QoS required in the D2D multicast service, and the service information 240 represents information of the D2D multicast service. The location information 250 represents location information of a multicast transmitting terminal for transmitting the D2D multicast service. The base station information 260 represents information of a base station to which the multicast transmitting terminal is attached. The terminal ID 270 represents an identifier of the multicast transmitting terminal. The service type 280 represents whether the D2D multicast service is provided in a multicast scheme or in a broadcast scheme. The service area information 290 represents information on an area where the D2D multicast service is provided. The D2D multicast service area may include a plurality of base stations, and may be set to reuse the resource.

The multicast coordinator 120 may manage information on the D2D multicast services for each D2D multicast service category. The D2D multicast service categories may include, for example, categories such as a personal broadcasting, a commercial, and a location-based broadcasting. The D2D multicast service categories may include, for example, categories such as a friendship group broadcasting for a small group community and a stock or traffic broadcasting that can be viewed by specific service subscribers. The D2D multicast service categories may be used for a D2D multicast service receiving terminal to receive a broadcast service in accordance with the category. Each category may include a plurality of D2D multicast services.

Figure 3:
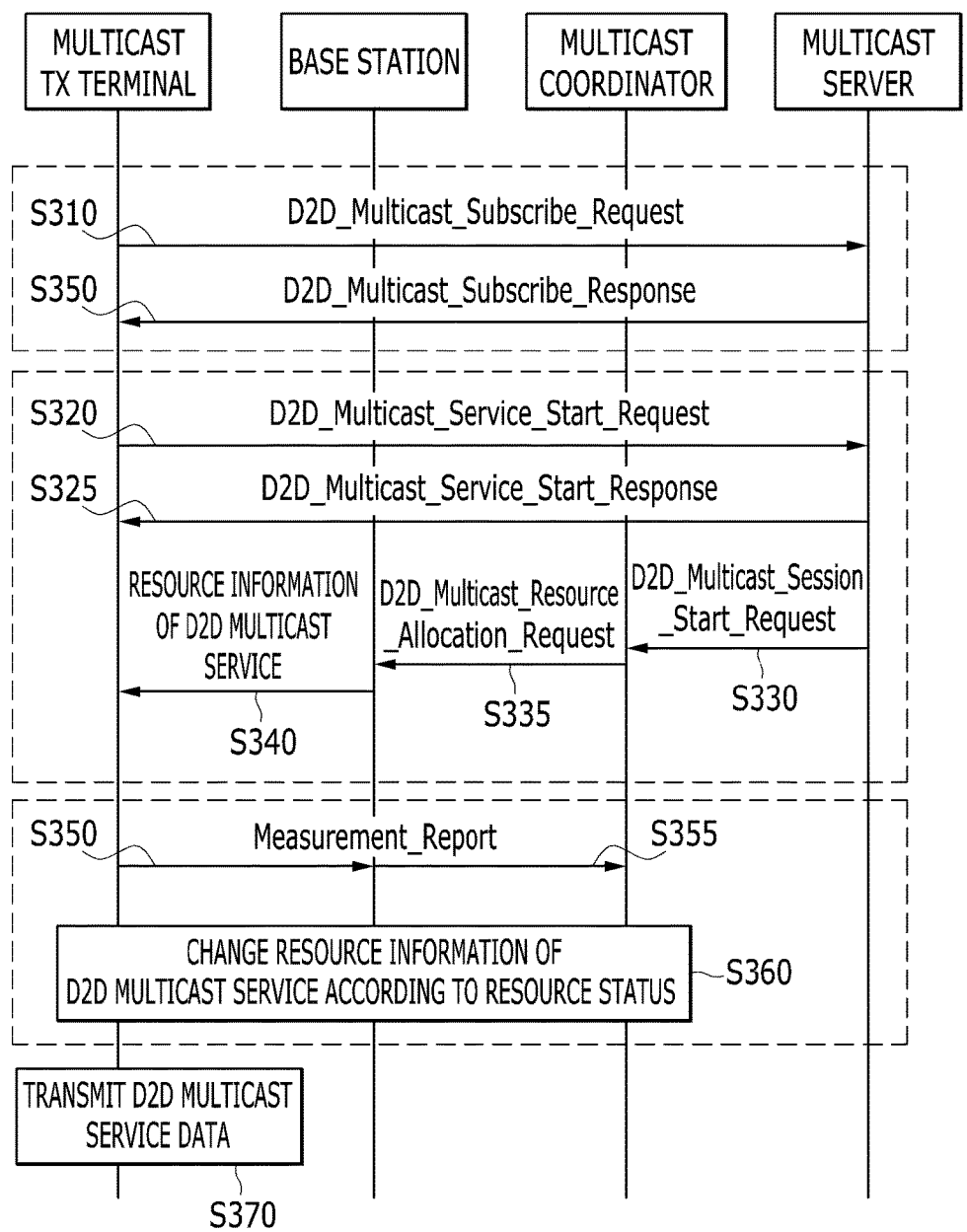
FIG. 3 is a schematic flowchart showing a multicast service providing method in a terminal-to-terminal direct communication according to an embodiment of the present invention.

FIG. 3 is a schematic flowchart showing a multicast service providing method in a D2D direct communication according to an embodiment of the present invention.

Referring to FIG. 3, a multicast transmitting terminal performs a D2D multicast subscribe process in order to provide a D2D multicast service (S310 and S315). The multicast transmitting terminal transmits a D2D multicast subscribe request message to a multicast server (S310). The multicast server processes the D2D multicast subscribe request, and then transmits a D2D multicast subscribe response message to the multicast transmitting terminal as a response of the D2D multicast subscribe request message (S315). The multicast transmitting terminal may execute the D2D multicast subscribe process online or offline. When the multicast transmitting terminal has been already subscribed in a D2D multicast, the D2D multicast subscribe process may be omitted. The D2D multicast subscribe process may be provided on a higher protocol lever above an internet protocol (IP).

D2D multicast subscribe request message includes information on a D2D multicast service to be provided by the multicast transmitting terminal and information on a service provider. The information on the D2D multicast service D2D may include identification information (for example, a service name) of the D2D multicast service, a service type of the D2D multicast service, and a service category of the D2D multicast service. The service type indicates whether a type of the provided service is a multicast scheme or a broadcast scheme. The service category represents a category of the service. The information on the service provider may include an ID of the multicast transmitting terminal, and may further include mobility degree of the multicast transmitting terminal and/or authentication information. The mobility degree may indicate low mobility or high mobility. The low mobility may correspond to a case that a user of the multicast transmitting terminal is walking, and the high mobility may correspond to a case that the user is moving in a vehicle. The mobility degree may be used for the multicast coordinator to allocate a resource.

Upon receiving the D2D multicast subscribe request message, the multicast server processes the D2D multicast subscribe request, and then registers the D2D multicast service and stores registration information. The multicast server generates the D2D multicast subscribe response message including a subscribe result indicating a result of the D2D multicast service subscribe and the registration information. The registration information includes a D2D multicast service ID that is an ID which the multicast server allocates to the D2D multicast service by the multicast transmitting terminal. The registration information may further include authentication information (for example, an authentication key).

After the multicast transmitting terminal performs the D2D multicast subscribe process, a D2D multicast service start and resource allocation process is performed in accordance with a request of the multicast transmitting terminal (S320, S325, S330, S335, and S340).

First, the multicast transmitting terminal turns on the D2D multicast service, and transmits a D2D multicast service start request message to the multicast server (S320). The multicast server transmits a D2D multicast service star response message to the multicast transmitting terminal as a response of the D2D multicast service start request message (S325). The D2D multicast service start request message may include an D2D multicast service ID indicating the D2D multicast service to be started and location information of the multicast transmitting terminal. The D2D multicast service start request message may further include QoS information of the D2D multicast service and/or authentication information of the D2D multicast service. The multicast server determines whether to permit the D2D multicast service start request, and transmits the D2D multicast service start response message including a result of the permission to the multicast transmitting terminal.

When transmitting to the multicast transmitting terminal the D2D multicast service start response message including a result that the D2D multicast service start request is permitted (S325), the multicast server transmits a D2D multicast session start request message to the multicast coordinator, thereby requesting to allocate a resource for the D2D multicast service (S330). For the resource allocation, the D2D multicast session start request message includes the D2D multicast service ID and a terminal ID of the multicast transmitting terminal. The D2D multicast session start request message may further include the QoS information for the D2D multicast service and/or the location information of the multicast transmitting terminal.

The multicast coordinator allocates the resource to the D2D multicast service in response to the D2D multicast session start request message, and transmits a D2D multicast resource allocation request message including information on the allocated resource to a plurality of base stations managed by the multicast coordinator (S335). The D2D multicast resource allocation request message includes the D2D multicast service ID and the information on the resource allocated to the D2D multicast service. The D2D multicast resource allocation request message may further include the QoS information for the D2D multicast service and/or service area information of the D2D multicast service.

At least one base station among the base stations receiving the D2D multicast resource allocation request message transmits the resource information of the D2D multicast service to the multicast transmitting terminal through a D2D multicast control channel (S340). The D2D multicast control channel may be a channel which is periodically transmitted from the base station to the terminal.

Next, the multicast transmitting terminal performs a resource status report and resource information change process for the allocated response (S350, S355, and S360). The multicast transmitting terminal periodically transmits a measurement report message to the base station in order to report a resource status for the allocated resource (S350). The base station transfers the received measurement report message to the multicast coordinator (S355). The measurement report message may include an index and resource status information of the allocated resource. The resource status information may include, for example, a reference signal received power (RSRP). The multicast coordinator may change resource information of the D2D multicast service in accordance with the resource status information of the allocated resource (S360). When changing the resource information of the D2D multicast service, the multicast coordinator transfers the changed resource information to the terminal via the base station (S360).

After the resource allocation is completed, the multicast transmitting terminal provides the D2D multicast service by transmitting D2D multicast service data through the D2D multicast traffic channel (S370).

Figure 4:
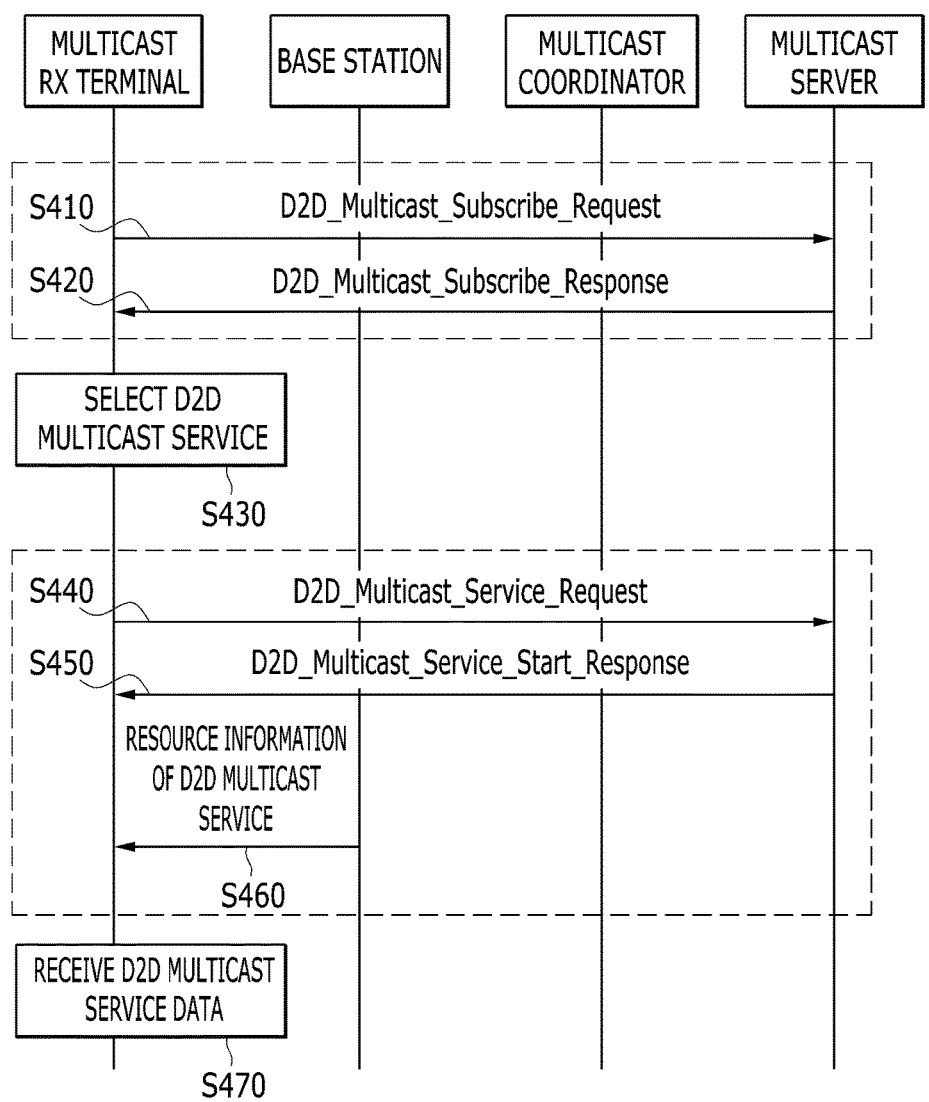
FIG. 4 is a schematic flowchart showing a multicast service receiving method in a terminal-to-terminal direct communication according to an embodiment of the present invention.

FIG. 4 is a schematic flowchart showing a multicast service receiving method in a D2D direct communication according to an embodiment of the present invention.

Referring to FIG. 4, a multicast receiving terminal performs a D2D multicast subscribe process to receive a D2D multicast service (S410 and S420). The multicast receiving terminal transmits a D2D multicast subscribe request message to a multicast server (S410). After processing the D2D multicast subscribe request, the multicast server transmits a D2D multicast subscribe response message including a subscribe result to the multicast receiving terminal as a response of the D2D multicast subscribe request message (S420). The multicast receiving terminal may perform the D2D multicast subscribe process online. When the multicast receiving terminal has been already subscribed in a D2D multicast, the D2D multicast subscribe process may be omitted. When a service type of the D2D multicast service which the multicast receiving terminal wants to receive is the broadcast scheme, the multicast receiving terminal may omit the D2D multicast subscribe process. The D2D multicast subscribe process may be provided on a higher protocol lever above an IP.

The D2D multicast subscriber request message includes current location information of the multicast receiving terminal. The D2D multicast subscribe request message may further include information on the D2D multicast service which the multicast receiving terminal wants to receive. The information on the D2D multicast service may include a service category. The D2D multicast subscriber request message may further include authentication information. The multicast server performs a subscribing process of the multicast receiving terminal, and searches for D2D multicast services that are being served to the current location of the multicast receiving terminal which is acquired form the D2D multicast subscribe request message. The multicast server generates a D2D multicast subscribe response message including a list of information of D2D multicast services that are being served. The information of the D2D multicast services may include D2D multicast service IDs.

Next, the multicast receiving terminal selects a D2D multicast service which it wants to receive from among the D2D multicast service information list (S430), and perform information acquiring process for the selected D2D multicast service (S440, S450, and S460).

The multicast receiving terminal transmits to a multicast server a D2D multicast service request message including an ID of the D2D multicast service to be received (S440). The multicast server transmits a D2D multicast service start response message to the multicast receiving terminal as a response of the D2D multicast service request message (S450). The D2D multicast service request message may include location information of the multicast receiving terminal. The D2D multicast service request message may further include authentication information. The multicast server generates a D2D multicast service start response message including information on a D2D multicast service where a session currently starts in accordance with the request of the multicast receiving terminal. The information on the D2D multicast service may include access information to the multicast transmitting terminal. The information on the D2D multicast service may include a service area of the D2D multicast service and a D2D multicast service ID.

Upon receiving the D2D multicast service start response message, the multicast receiving terminal acquires resource information for the currently served D2D multicast service from a base station through a D2D multicast control channel based on the information on the D2D multicast service (S460).

Next, the multicast receiving terminal receives D2D multicast service data through the D2D multicast channel based on the acquired resource information (S470).

As described above, according to an embodiment of the present invention, since the multicast coordinator manages the resources for the D2D multicast services, the D2D multicast service may be provided between terminals if the terminals are geographically close although they are connected to the different base station.

Figure 5:
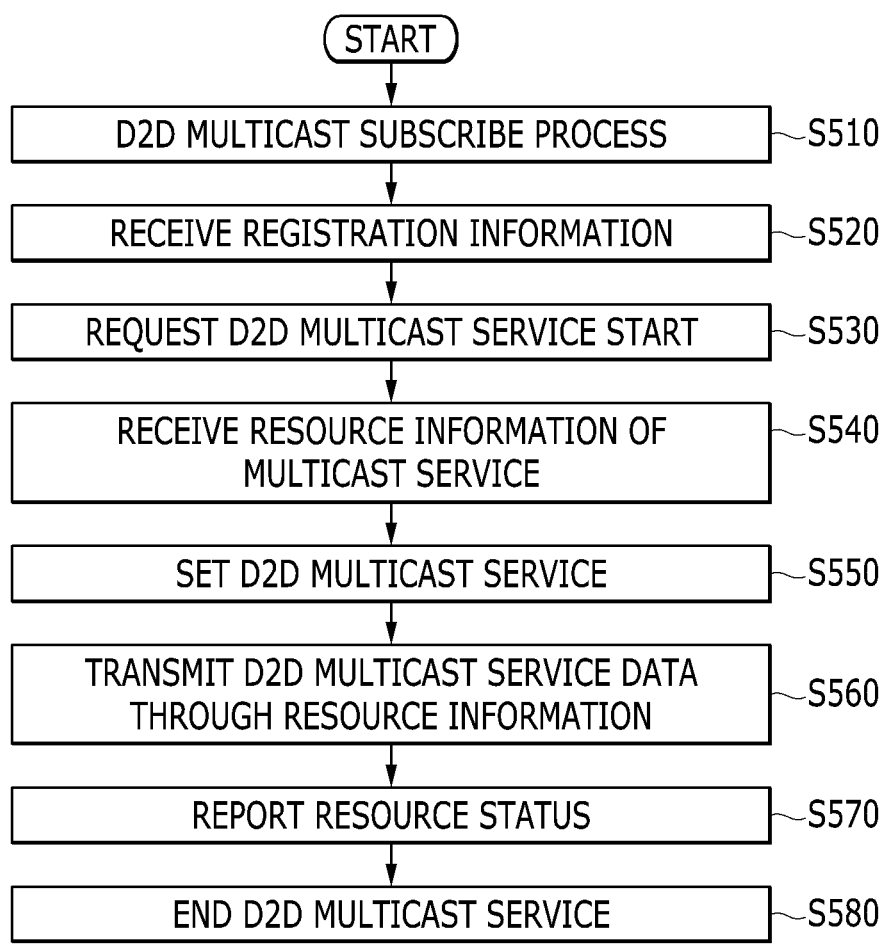
FIG. 5 is a schematic flowchart showing a multicast service providing method of a multicast transmitting terminal in a terminal-to-terminal direct communication according to an embodiment of the present invention.

FIG. 5 is a schematic flowchart showing a multicast service providing method of a multicast transmitting terminal in a D2D direct communication according to an embodiment of the present invention.

Referring to FIG. 5, the multicast transmitting terminal performs a D2D multicast subscribe process to provide a D2D multicast service (S510). For the D2D multicast subscribe, the multicast transmitting terminal provides a multicast server with a service type of a D2D multicast service to be served, service identification information (for example, a name) of the D2D multicast service, and information of a service provider. The information of the service provider may include an ID of the multicast transmitting terminal, mobility degree of the multicast transmitting terminal, and authentication information. The multicast transmitting terminal receives registration information from the multicast server in accordance with the D2D multicast subscribe process (S520). The registration information includes a D2D multicast service ID which the multicast server allocates to the D2D multicast service.

When the multicast transmitting terminal attempts to start the D2D multicast service, the multicast transmitting terminal transmits a D2D multicast service start request message to the multicast server by using the registration information (S530). Accordingly, the multicast transmitting terminal receives resource information allocated to the D2D multicast service ID from a multicast coordinator via a base station (S540). The multicast transmitting terminal sets the D2D multicast service in accordance with the received resource information (S550), and provides the D2D multicast service by transmitting D2D multicast service data through the corresponding resource (S560).

While the multicast transmitting terminal is providing the D2D multicast service, the multicast transmitting terminal reports a status of the allocated resource to the multicast coordinator via the base station (S570). The resource status report may be periodically performed, or may be performed when a specific event occurs. When the allocated resource is changed according to the resource status report, the multicast transmitting terminal applies the changed resource information to the D2D multicast service. Further, when the multicast transmitting terminal wants to terminate the D2D multicast service, the multicast transmitting terminal notifies the multicast server of the end of the D2D multicast service (S580).

Figure 6:
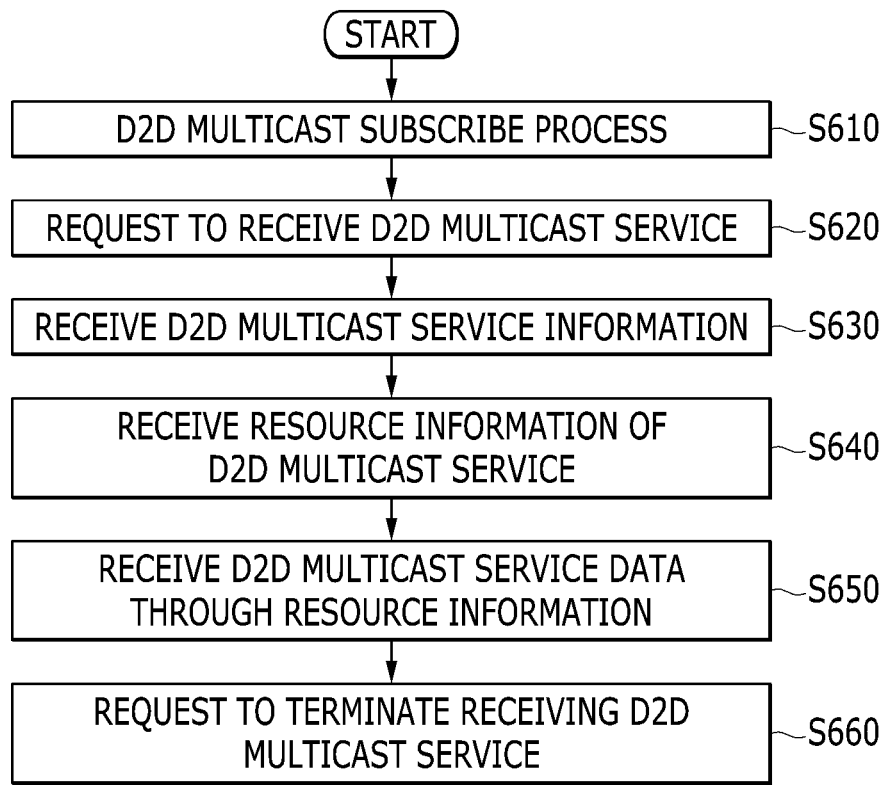
FIG. 6 is a schematic flowchart showing a multicast service receiving method of a multicast receiving terminal in a terminal-to-terminal direct communication according to an embodiment of the present invention.

FIG. 6 is a schematic flowchart showing a multicast service receiving method of a multicast receiving terminal in a D2D direct communication according to an embodiment of the present invention.

Referring to FIG. 6, a multicast receiving terminal performs a D2D multicast subscribe process to receive a D2D multicast service (S610). When a service type of the D2D multicast service which the multicast receiving terminal wants to receive is the broadcast scheme, the multicast receiving terminal may omit the D2D multicast subscribe process. The multicast receiving terminal can acquire information of the D2D multicast service which it wants to receive through the D2D multicast subscribe process.

The multicast receiving terminal transmits to a multicast server a service request message for the D2D multicast service which it wants to receive based on the information acquired by the subscribe process (S620), and receives information on the D2D multicast service from the multicast server (S630). Next, the multicast receiving terminal acquires from a base station resource information of the D2D multicast service to be received through a D2D multicast control channel and sets the D2D multicast service to be received (S640). The D2D multicast service to be received may be set based on the resource information and access information to the multicast transmitting terminal. When the D2D multicast service to be received is a broadcast scheme, the multicast receiving terminal may acquire from the base station the resource information of the D2D multicast service to be received through the D2D multicast control channel without transmitting the service request message to the multicast server.

Next, the multicast receiving terminal receives D2D multicast service data through a D2D multicast channel based on the set information (S650). When the multicast receiving terminal wants to terminate receiving the D2D multicast service, the multicast receiving terminal transmits an end request message to the D2D multicast service (S660). When the D2D multicast service is the broadcast scheme, the multicast receiving terminal may terminate receiving the D2D multicast service without transmitting the receiving end request message to the multicast server. The service request and the end request for the D2D multicast service may be used as information for determining termination of the D2D multicast service by the multicast transmitting terminal.

Figure 7:
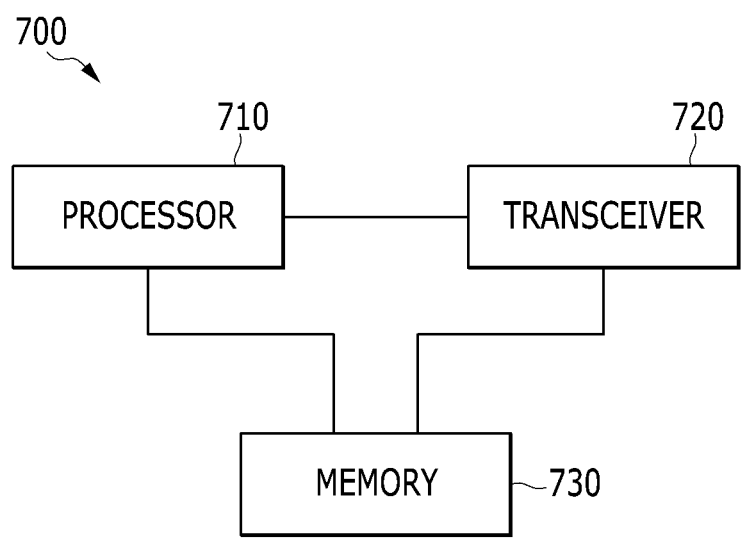
FIG. 7 is a schematic block diagram of a multicast service providing apparatus in a terminal-to-terminal direct communication according to an embodiment of the present invention.

FIG. 7 is a schematic block diagram of a multicast service providing apparatus in a terminal-to-terminal direct communication according to an embodiment of the present invention.

Referring to FIG. 7, a multicast service providing apparatus 700 includes a processor 710, a transceiver 720, and a memory 730. The multicast service providing apparatus 700 may be included in a multicast transmitting terminal or may be the multicast transmitting terminal.

The processor 710 generates a D2D multicast subscribe request message, a D2D multicast service start request message, and measurement report message, and processes D2D multicast service data to be transmitted. The processor 710 processes a D2D multicast subscribe response message and resource information of the D2D multicast service to set the D2D multicast service.

The transceiver 720 transmits the D2D multicast subscribe request message and the D2D multicast service start request message to a multicast server, and transmits the measurement report message to the base station. The transceiver 720 receives the D2D multicast subscribe response message form the multicast server, and receives the resource information of the D2D multicast service from the base station. The transceiver 720 transmits the D2D multicast service data.

The memory 730 may store instructions to be executed by the processor 710, or may load instructions from a storage device (not shown) and temporarily store the instructions. The processor 710 executes the instructions stored or loaded in the memory 730. The memory 730 may temporarily store messages to be transmitted and received messages.

The processor 710 is connected to the memory 730 via a bus (not shown), and an input/output interface (not shown) may be connected to the bus. The input/output interface is connected to the transceiver 720, and peripheral devices such as an input device, a display device, a speaker, and the storage device may be connected to the input/output interface.

Figure 8:
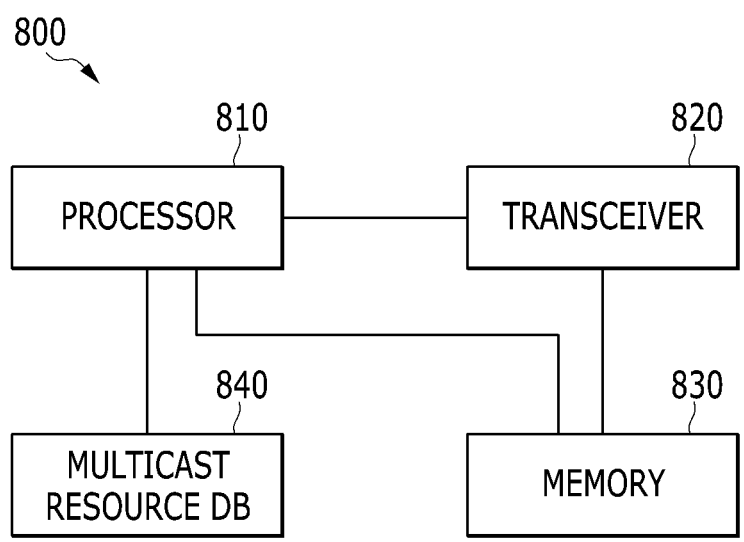
FIG. 8 is a schematic block diagram of a multicast service resource allocation apparatus in a terminal-to-terminal direct communication according to an embodiment of the present invention

FIG. 8 is a schematic block diagram of a multicast service resource allocation apparatus in a terminal-to-terminal direct communication according to an embodiment of the present invention.

Referring to FIG. 8, a multicast service resource allocation apparatus 800 includes a processor 810, a transceiver 820, a memory 830, and a multicast resource database 840. The multicast service resource allocation apparatus 800 may be included in a multicast coordinator or may be the multicast coordinator.

The transceiver 820 receives a D2D multicast session start request message from a multicast server, and transmits a D2D multicast resource allocation request message to a base station.

The processor 810 allocates a resource to a D2D multicast service based on information included in the D2D multicast session start request message, and stores the resource information and the information included in the D2D multicast session start request message to the multicast resource database 840 as D2D multicast service information. The resource information is stored in association with the information included in the D2D multicast session start request message.

The memory 830 may store instructions to be executed by the processor 810, or may load instructions from a storage device (not shown) and temporarily store the instructions. The processor 810 executes the instructions stored or loaded in the memory 730. The memory 830 may temporarily store messages to be transmitted and received messages.

The processor 810 is connected to the memory 830 via a bus (not shown), and an input/output interface (not shown) may be connected to the bus. The input/output interface is connected to the transceiver 820, and peripheral devices such as an input device, a display device, a speaker, and the storage device may be connected to the input/output interface. The multicast resource database 840 may be stored in the memory 830 or the storage device.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method of providing a multicast service by a terminal in a terminal-to-terminal direct communication, the method comprising:

transmitting a multicast subscribe request message to a multicast server;

receiving a multicast subscribe response message including a result of the multicast subscribe request from the multicast server;

transmitting a service start request message requesting a start of a multicast service to the multicast server;

receiving a service start response message including a result of permitting a start request from the multicast server;

receiving, via a base station among a plurality of base stations, resource information of a resource which a multicast coordinator allocates to the multicast service in accordance with a request of the multicast server, wherein the multicast coordinator is connected to the plurality of base stations and manages resources of the plurality of base stations; and transmitting multicast service data based on the resource information, wherein the service start request message includes an identifier of the multicast service and location information of the terminal, and wherein the multicast subscribe request message includes an identifier of the terminal and mobility degree of the terminal.

2. The method of claim 1, wherein the service start request message further includes quality of service (QoS) information for the multicast service.

3. The method of claim 1, further comprising:

reporting a status of the allocated resource to the multicast coordinator via the base station; and receiving changed resource information for the multicast service from the multicast coordinator via the base station.

4. The method of claim 1, wherein the multicast subscribe request message further includes a service type of the multicast service, and wherein the service type indicates whether the multicast service is provided in a multicast scheme or a broadcast scheme.

5. A method of allocating a resource for a multicast service by a multicast coordinator in a terminal-to-terminal direct communication, the method comprising:

receiving from a multicast server a multicast session start request message requesting resource allocation for a multicast service in accordance with a request of a terminal starting the multicast service, the terminal being subscribed in the multicast service by transmitting a multicast subscribe request message to the multicast server and receiving a multicast subscribe response message including a result of the multicast subscribe request from the multicast server, and the multicast subscribe request message including an identifier of the terminal and mobility degree of the terminal;

allocating a resource to the multicast service;

storing resource information of the allocated resource and information on the multicast service; and transmitting a resource allocation request message including the resource information to a plurality of base stations, wherein the multicast coordinator is connected to the plurality of base stations and manages resources of the plurality of base stations, wherein the multicast session start request message includes an identifier of the multicast service and location information of the terminal, and wherein the multicast session start request message is received from the multicast server which receives a multicast subscribe request message from the terminal.

6. The method of claim 5, wherein the resource information is transmitted to the terminal through at least one of the plurality of base stations.

7. The method of claim 5, wherein the multicast session start request message further includes an identifier of the terminal.

8. The method of claim 7, wherein the multicast session start request message further includes quality of service (QoS) information for the multicast service.

9. The method of claim 5, wherein the resource allocation request message further includes an identifier of the multicast service.

10. The method of claim 9, wherein the resource allocation request message further includes QoS information for the multicast service and service area information of the multicast service.

11. An apparatus for providing a multicast service in a terminal-to-terminal direct communication, the apparatus comprising:
 a processor configured to generate a service start request message requesting a start of a multicast service and a multicast subscribe request message; and
 a transceiver configured to transmit the multicast subscribe request message, to receive a multicast subscribe response message including a result of the multicast subscribe request from the multicast server, to transmit the service start request message to a multicast server, to receive a service start response message including a result of permitting a start request from the multicast server, to receive, via a base station among a plurality of base stations, resource information of a resource which a multicast coordinator allocates to the multicast service in accordance with a request of the multicast server, and to transmit multicast service data based on the resource information,
 wherein the multicast coordinator is connected to the plurality of base stations and manages resources of the plurality of base stations,
 wherein the service start request message includes an identifier of the multicast service and location information of the terminal, and
 wherein the multicast subscribe request message includes an identifier of the terminal and mobility degree of the terminal.

12. The apparatus of claim 11, wherein the processor generates a multicast subscribe request message including information on a service type of the multicast service,
 wherein the transceiver transmits the multicast subscribe request message to the multicast server and receives a multicast subscribe response message including a result of the multicast subscribe request from the multicast server, and
 wherein the service type indicates whether the multicast service is provided in a multicast scheme or a broadcast scheme.

13. An apparatus for allocating a resource for a multicast service in a terminal-to-terminal direct communication, the apparatus comprising:
 a database;
 a processor configured to allocate a resource to a multicast service in response to a multicast session start request message that is transmitted by a multicast server in accordance with a request of a terminal starting the multicast service, the terminal being subscribed in the multicast service by transmitting a multicast subscribe request message to the multicast server and receiving a multicast subscribe response message including a result of the multicast subscribe request from the multicast server, and the multicast subscribe request message including an identifier of the terminal and mobility degree of the terminal, and store resource information of the allocated resource and information on the multicast service in the database; and
 a transceiver configured to receive the multicast session start request message and to transmit a resource allocation request message including the resource information to a plurality of base stations,
 wherein the multicast session start request message includes an identifier of the multicast service and location information of the terminal, and
 wherein the apparatus is connected to the plurality of base stations and manages resources of the plurality of base stations.

14. The apparatus of claim 13, wherein the resource information is transmitted to the terminal through at least one of the plurality of base stations.

15. The apparatus of claim 13, wherein the multicast session start request message further includes quality of service (QoS) information for the multicast service.

16. The apparatus of claim 13, wherein the resource allocation request message further includes QoS information for the multicast service and service area information of the multicast service.

* * * * *